(12) United States Patent
O'Neill et al.

(10) Patent No.: US 7,522,589 B2
(45) Date of Patent: Apr. 21, 2009

(54) NETWORK UNITS FOR USE IN AND ORGANISATION OF CASCADE SYSTEMS

(75) Inventors: Eugene O'Neill, Dublin (IE); Kam Choi, Tring (GB); Edele O'Malley, Dublin (IE); Maurice A Goodfellow, Dunstable (GB)

(73) Assignee: 3Com Corporation, Marlborough, MA (US)

( * ) Notice: Subject to any disclaimer, the term of this patent is extended or adjusted under 35 U.S.C. 154(b) by 836 days.

(21) Appl. No.: 10/337,299

(22) Filed: Jan. 7, 2003

(65) Prior Publication Data

US 2004/0095928 A1    May 20, 2004

(30) Foreign Application Priority Data

Nov. 20, 2002    (GB)    ................ 0227048.6

(51) Int. Cl.
H04L 12/28    (2006.01)
(52) U.S. Cl. .................................................. 370/389
(58) Field of Classification Search ................. 370/351, 370/389, 400, 401, 406, 431, 432; 709/200, 709/201, 220, 238, 243
See application file for complete search history.

(56) References Cited

U.S. PATENT DOCUMENTS

| | | | | |
|---|---|---|---|---|
| 5,220,562 A | * | 6/1993 | Takada et al. ............... | 370/404 |
| 5,371,852 A | * | 12/1994 | Attanasio et al. ............ | 709/245 |
| 5,394,402 A | * | 2/1995 | Ross ........................... | 370/402 |
| 5,485,455 A | * | 1/1996 | Dobbins et al. ............. | 370/255 |
| 5,613,069 A | * | 3/1997 | Walker ....................... | 709/238 |
| 5,793,764 A | * | 8/1998 | Bartoldus et al. ........... | 370/390 |
| 5,926,473 A | | 7/1999 | Gridley | |
| 5,940,596 A | * | 8/1999 | Rajan et al. ................. | 709/242 |
| 6,018,766 A | * | 1/2000 | Samuel et al. ............... | 709/218 |
| 6,115,378 A | * | 9/2000 | Hendel et al. ............... | 370/392 |
| 6,160,811 A | * | 12/2000 | Partridge et al. ............ | 370/401 |
| 6,208,644 B1 | * | 3/2001 | Pannell et al. ............... | 370/389 |
| 6,553,031 B1 | * | 4/2003 | Nakamura et al. .......... | 370/392 |

(Continued)

FOREIGN PATENT DOCUMENTS

EP    0930746 A1    7/1999

(Continued)

OTHER PUBLICATIONS

"Computer Networks" 1996, pp. 354-403, XP-002155220, IEEE Network vol. 2, No. 1, 1998, pp. 5 to 9.

(Continued)

*Primary Examiner*—Dmitry Levitan (57) ABSTRACT

A multi-port network unit for use in a cascade system of network units sends from a cascade port a packet including a special header having a source port ID, a destination port ID and a 'destination port known' field. The port IDs identify both a unit and a port within a unit. A routing database is set up, optionally by a discovery protocol, in terms of ports and either destination units (within the cascade) or source units (within the cascade). The database includes a mesh table, indicating from which cascade port a packet with a known destination port ID should be forwarded, without needing a fresh look-up. The database also includes a multicast exclusion table which allows ingress of packets with source unit IDs matched to an ingress port. The scheme allows a general mesh type of cascade while dynamically preventing closed loops.

7 Claims, 5 Drawing Sheets

U.S. PATENT DOCUMENTS

| | | | |
|---|---|---|---|
| 6,567,417 B2 * | 5/2003 | Kalkunte et al. | 370/428 |
| 6,625,124 B1 * | 9/2003 | Fan et al. | 370/235 |
| 6,640,206 B1 * | 10/2003 | Callender et al. | 709/253 |
| 7,095,738 B1 * | 8/2006 | Desanti | 370/389 |
| 2002/0034187 A1 * | 3/2002 | Kalkunte et al. | 370/401 |

FOREIGN PATENT DOCUMENTS

| | | | |
|---|---|---|---|
| EP | 1193917 A2 | 4/2002 | |
| EP | 1193917 A3 | 2/2003 | |
| GB | 2361830 A | 10/2001 | |
| GB | 2362538 A | 11/2001 | |

OTHER PUBLICATIONS

"Computer Networks" 1996, pp. 37-43, IEEE Network, vol. 2, No. 1, 1988.

European Search Report from foreign counerpart application No. 06023983.7.

European Search Report from foreign counterpart application No. 06023984.5.

* cited by examiner

CROSSBAR CASCADE

FIG.3

RING CASCADE

FIG.2

MESH CASCADE

NETWORK UNITS FOR USE IN AND ORGANISATION OF CASCADE SYSTEMS

FIELD OF THE INVENTION

This invention relates to packet-switched communication networks, particularly although not necessarily exclusively to 'Ethernet' systems. The invention more particularly relates to the organization and control of cascade systems in which a multiplicity of multiport units can be managed as a single entity. Objects of the invention include tolerance for a variety of different configurations of the cascade system, tolerance for a substantial separation, if desired, between the units constituting the system, the provision of 'resilience' that is to say the ability to continue operation in the event of the failure or powering-down of a unit or a connecting link, and a tolerance for 'trunking' to, from and between the units in the cascaded system.

BACKGROUND TO THE INVENTION

Modern network units, by which one principally means switches and routers, have reached a substantial degree of sophistication and can be realized in a considerable variety of architectures. It is not intended to limit the invention to any particular architecture. Broadly, units of this nature can switch packets in accordance with either media access control address data (layer 2 in the OSI Model) or network address data (layer 3 in the OSI Model) and/or possibly information in higher layers. For this purpose a received packet may be temporarily stored, either in temporary storage associated with a respective ingress port, or in central memory which may have memory space or buffers permanently or temporarily associated with respective ports, in queues which may be constituted by the packets themselves along with status data or which may be constituted by pointers to locations in memory. Header information from the packets is subject to a look-up in order to obtain, with recourse to a database, forwarding information for the packet. This forwarding information may be subject to post-processing in accordance with a variety of rules, such as VLAN matching, quality of service, spanning tree rules and others which are important but have no direct bearing on the present invention. The intended result is always to determine, on the assumption that the packet is to be forwarded from the unit, which port or (in the case of a multicast packet) ports are to be selected for the forwarding of the packet from that unit. A switching engine typically is controlled by a port mask, obtained as a result of the look-up. The port mask identifies, directly or indirectly, the ports of the unit by number and (for a unicast packet) the port from which the packet should be forwarded. Generally speaking, 'switches' or 'bridges' are terms applied to units that switch in layer 2 and 'routers' is a term generally employed for switching in layer 3, since media access control data is employed to determine a device to which the packets should be forwarded whereas network address data relates to a network to which a packet should be forwarded. However, usage of these terms is not exclusive, because units capable of both bridging and routing are known. Accordingly, in the present application 'network unit' is employed to refer to a device which performs the forwarding of data to a selected port or ports having regard to address data in the packet and, optionally, other data which may relate to the type of packet and/or other data which may affect the forwarding decision.

Cascade Systems

Network units are made with a fixed number of ports which are employed for the reception of packets from and the forwarding of packets to the external network. It is generally now considered convenient to manufacture switches in a comparatively small number of individual 'sizes', in terms of the number of ports, and to provide in effect a network unit with a much larger number of ports by means of a 'cascade' system, wherein a multiplicity of multiport units are connected and organized so that they appear to the external network as a single switching or routing entity.

Various desirable features in modern network practice, the existence of a variety of forwarding rules, and the practical importance of employing 'resilience', has led to the development of sophisticated cascade systems.

'Resilience', as previously mentioned, is the feature characteristic of a system which can tolerate the powering-down or failure of a unit or a connecting link and which will maintain the 'cascade' or 'stack' in operation as far as the other units in the cascade are concerned. A good example is the system described in GB-A-2365718. That document describes a cascade system in which the network units in a stack are coupled by a special connector, known as a T-piece, which can provide continuity of a data path for packets in a ring connecting the units notwithstanding the powering-down or failure of a unit to which it is coupled. For that purpose the connectors contain a system of multiplexers which are under the control of control logic which determine the status of the various network units by means of the exchange of control frames with the network units.

Although a system as described in that document is satisfactory in operation, the reliance on special connectors imposes a hardware overhead and, moreover, constrains the cascade system to have the configuration of a ring. In practice also, the network units have to be in reasonably close proximity. Furthermore, the traffic volume for packets between the units is limited by the capacity of the data path through the connectors.

In a network unit which is in a cascade connection, a look-up has in general three possible results. The address may be 'unknown' in that there is no entry in the database which can determine the port or ports from which the packets should be forwarded. Such a result may have the consequence of 'flooding': the packet is transmitted out of all the ports of the switch, or possibly out of a group associated with a particular virtual segment of the network, if partitioning in the form of virtual LANs is used. A response from a destination conforming to the destination address may be established by means of an address resolution protocol (ARP). Second, the destination may be by way of a port on the respective unit, that is to say by way of a 'local' port. In such circumstances the packet can be forwarded out of the relevant port without recourse to the cascade connection. Thirdly, the destination may be by way of a port on another switch in the cascade, in which case the port number in the forwarding data would usually be a cascade port or possibly a 'logical' port connected to a group of cascade ports.

It is customary for look-up databases to include an address learning facility. Typically the source address data of an incoming packet is checked against entries in the database and if the source address is unknown it can be 'learnt' against the port by which it is received. It is also possible to insert entries in such databases.

One object of the present invention is to permit network units to be in a cascade system which may have a wide variety of configurations, and in particular a general mesh which provides a multiplicity of potential paths between units.

Additionally or alternatively, a further object of the invention is to permit the network units which constitute the cascaded system to be substantially widely spaced, for example in different buildings. Such a facility would substantially extend the versatility of cascade systems.

A further object of the invention is to control the forwarding of packets within the cascade in a manner which tolerates and indeed facilitates a variety of configurations including meshes.

A yet further object of the invention is to facilitate trunking between different units in the cascade connection; i.e. the provision of a multiplicity of parallel connections between units to increase the traffic capacity between them.

SUMMARY OF THE INVENTION

One aspect of the invention concerns a facility to maintain, for example by means of registers, in effect a unit-port routing database which relates the other units in the cascade to the ports of a unit. Thereby there may be provided a control which can be employed by the switching engine to determine, if the result of a look-up is to forward a packet on to the cascade system to another unit in the cascade, which port to employ.

As will be apparent later, such a database, which may have the form of a table or set of tables, can cope with a wide variety of different topographical arrangements of the units in a cascade connection. More particularly, it facilitates the provision of a cascade in the form of a mesh wherein there may be a multiplicity of different possible paths from any one unit in the cascade connection to another. It is readily feasible, by means of a discovery protocol, to determine a preferred route from any unit to any other and thereby to populate a table, herein called 'mesh table', with a specified route which will be employed in the absence of operational failure on that route.

Another feature of the invention is the use of special packet status words, called herein 'headers' which preferably are employed while a packet is within the cascade system and, among other things, include portions which can identify a (known) destination unit within the cascade and a source destination unit within the cascade, and preferably uniquely identify within the system a destination port for a packet provided that destination port is known. In particular, the special header may include a field which has bits identifying a respective unit and other bits identifying a port number within that unit, so that the entire field uniquely identifies a single port in the cascaded group of units. Moreover, the special header preferably includes a field, herein called the 'DPK' field, which indicates whether the destination port identification is valid or not. The header preferably identifies a source port in the same manner as a destination port.

Such a packet header has particular advantages. First of all, it facilitates the performance of a look-up in the 'source' unit, that is to say the first unit in the cascade group that receives an addressed packet from the external network. The look-up performed in the source unit can not only establish the port to which the packet should be directed, particularly in the case of a unicast packet, but also, in conjunction with the aforementioned table, determine the egress port from which the packet should be dispatched to another network unit in the cascade connection. The provision has the added advantage that a subsequent look-up in any other unit of the cascade is unnecessary, and the DPK field may be used to inhibit an address look-up in any subsequent unit in the cascade.

It will be understood that since the cascade system may be constituted by a mesh of units, this being indeed the preferred form of the cascade system, there can be a multiplicity of loops within the cascade system. Those skilled in the art will appreciate that in network practice it is not desirable to include loops, which allow the endless circulation of packets and consequent failure of the system. Although it is well known to employ what is known as a 'spanning tree' algorithm or protocol to ensure that there is no undesirable loop within a network an ordinary algorithm of this nature is inappropriate for use within a system which in effect constitutes a single entity.

However, loops must necessarily exist in a mesh. As will be explained more particularly hereinafter, the system of an identification of destination within the cascade and the provision of a database which will prescribe, at any time, a single port (or possibly a linked group of ports) for the dispatch of a unicast packet from a network unit in the cascade, will avoid the consequences of loops in the mesh in respect of unicast packets.

For multicast packets the situation is more complex, because multicast packets will inherently have to be dispatched from a multiplicity of ports of a network unit.

A further feature of the invention is a means of selectively preventing the looping of multicast packets around the cascade. In particular, it is envisaged that the database should include a table which will selectively cause the discard of packets of which the destination is unknown. By arranging for multicast packets to indicate in the special header that the destination port is unknown, there is a mechanism for accessing the 'multicast exclusion table'.

The exclusion table needs to ensure that there is at any time a single route from any given unit to any other unit in the mesh. In a variety of circumstances the routes prescribed by the mesh table and the exclusion table may be the same and accordingly either a single table could be used for the purposes of both tables or one table could be simply derived from the other. In practice it is at least convenient to maintain the tables separately and in some circumstances they may prescribe a different set of routes within the cascade. In any case, when a multicast packet (as denoted by the DPK field) is received at a port of a unit in the cascade the packet can be discarded unless there is a match of the 'source unit' of that packet with the (other) unit associated with that port in the exclusion table.

As will be apparent later, repeated performance of the aforementioned discovery protocol enables the detection of operational failure of a unit or a link between units and the reconfiguration of the database (e.g. the mesh table and/or the exclusion table) to maintain the operation of the remaining parts of the cascade system.

For example the mesh table can be modified either to cause discard of packets which would have to be dispatched to an operative unit or, if possible, to provide another route in the mesh to that unit in the event that the failure is due to a link.

Alternatively or additionally operational failure may be detected by an ordinary process of maintenance of a link; such maintenance is an ordinary function of a physical layer (PHY) in an Ethernet system. The PHY can be modified to signal the CPU or whatever entity is employed for maintenance and updating of the table or tables, when there is link failure, denoted for example by the absence of link pulses or otherwise.

Since thereby the invention is not reliant on a complex control system for determining the operational status of the links or the remote units, and standard Ethernet links may be employed between the network units, there is no particular limitation on the separation of the units (other than the limits normally imposed on a local area network). Accordingly, the network units in the cascade can be located substantial distances apart and in particular in different buildings.

Other features and objects of the present invention will become apparent from the following description with reference to the accompanying drawings.

GENERAL DESCRIPTION OF A SWITCH

Figure 1:
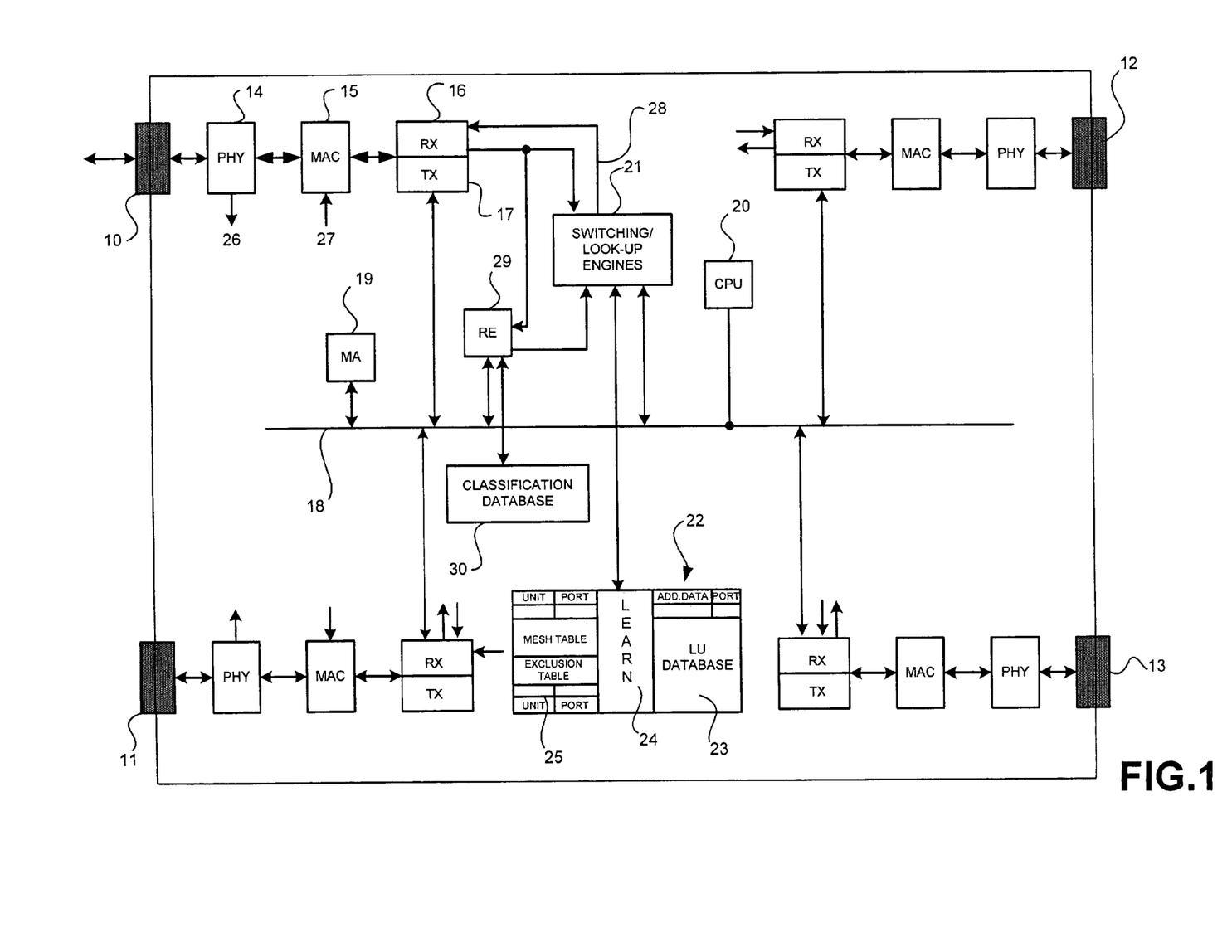
FIG. 1 is a schematic illustration of a switch which may be employed in a cascade system according to the invention.

FIG. 1 illustrates the preferred functions of a switch or router according to the invention. It should be clearly understood that there is a wide variety of switch architectures in which the invention should be employed. Moreover, modern switches are physically exceedingly complex and many of the functions which are explicitly shown, for the sake of simplicity, in FIG. 1 are performed in software.

For example, there is a substantial variation in the organization of memories. Although FIG. 1 illustrates receive and transmit queues apparently physically located with each input port, switches can employ a system of buffers or a single memory, which may be 'off-chip' for the storage of packets during the processing of their headers and so on.

Furthermore, it is readily possibly to construct a switch in the form of a multiplicity of separate modules or chips each of which is associated with a specific multiplicity of ports and which includes its own look-up processing. Each module has a multiplicity of sets of high-speed parallel links by means of which the various parts of the module communicate with each other.

In the exemplary and functionally illustrated switch shown in FIG. 1, the switch is shown as having four ports 10, 11, 12 and 13. More typically a switch would have twelve, twenty-four or even more ports; the specific example described hereinafter for a special header for packets within the cascade allows for up to 128 ports on each of eight switches.

As will be described only for the port 10, the other ports having similar provisions, the port 10 is associated with a physical layer device (PHY) 14 which is intended in this example to conform to the physical layer attributes and features set out in IEEE 802.3. Such physical layer devices include the automatic establishment of a link with a partner (i.e. a network device at the other end of the link) by auto-negotiation and the detection of the failure of a link (the relevant failure detection signal being denoted by an arrow 26).

Coupled to the PHY 14 is a media access controller (MAC) 15, which, again in this specific example, is intended to conform to the requirements of a media access layer (layer 2) in accordance with IEEE 802.3. The MAC will receive the incoming packet in a media independent form and will perform a variety of features, such as for example flow control and CRC checking, as also described later.

Also associated with this port is memory space shown as an RX memory space 16 and a TX memory space 17. These are schematically intended to illustrate, for the sake of example, a receive (RX) queue and a transmit (TX) queue. The receive queue comprises or identifies packets received at the port and awaiting processing until they are either discarded or transferred across the switch by means of a link table operated in generally known manner by a switching engine. The TX queue represents a queue of packets (or a set of pointers defining packets stored elsewhere in memory) awaiting dispatch from the port 10, which in this example is presumed to be a bi-directional port.

As mentioned, there are similar features 14 to 17 associated with each of the other ports.

The numeral 18 denotes a bus system by means of which the various receive and transmit sections can communicate with each other and with the various controlling engines to be described. In practice the bus system 18 is substantially more complicated than the schematic illustration and in general comprises a data path (e.g. between memory spaces 16 and database 22), a control path (e.g. between a CPU and various other blocks) and a 'register' path, the latter being used to convey information derived from management frames to various registers in the switch. However, the layout of the buses and the organization of management are not directly relevant to a switch according to the invention and are presumed to be within the knowledge of the skilled reader.

Shown as coupled to bus 18 is a management agent (MA) 19 which can receive management or control frames which are employed to configure and control various registers throughout the switch including the registers which are specific to the present invention.

Also shown as coupled to the bus 18 is a central processor (CPU) 20 which acts in ordinary manner to control and co-ordinate the various operational blocks of the switch. In a practical switch there may be more than one CPU.

Also shown as coupled to bus 18 are switching and look-up engines 21. These are coupled to databases 22. These may be implemented as a hardware unit or in software or both. Engines 21 perform the customary look-up and switching or routing operations principally based on address data in received packets.

In an ordinary switch or router, as mentioned previously, the look-up engine will have recourse to a look-up database, shown in FIG. 1 as LU 23, in order to obtain forwarding data ultimately defining a port or ports from which a packet should be dispatched in accordance with destination address data and possibly various classification or other rules which may be imposed on the switch as a 'management policy' or be determined by forwarding rules. The switching engine acts on the forwarding data to transfer the packet in known manner to a transmit queue and for forwarding from a selected port. Database 23 is shown as including entries composed of (destination) addresses and ports. Also shown, as part of database 22, is a 'learn' block 24. This represents the normal learning facility of address databases. Entries in look-up table 23 can be made by the source address and the ingress port. Additionally they can be made in response to an address resolution protocol, which includes broadcasting a packet whose address is unknown and inserting the destination address and port number of a responding unit.

Also shown as part of the databases 22 in FIG. 1 is a further storage device, shown as 'mesh table' 25a. Another storage device is an exclusion table 25b which effectively controls the interruption of the loops which normally exist in the cascade mesh. Each table lists the other units in the cascade against ports of the unit. As mentioned earlier, the tables could be constituted by a single table but it is preferable to provide two distinct tables either for each unit of for each port in each unit.

Included within the database 22 or otherwise is some means (such as a register) which defines the address data of the unit, e.g. its network address.

Finally, although it is not directly relevant to the invention, there is shown a rules engine (RE) 29 coupled to the receive queue 16 and to a classification database 30. This (optional) feature is or may be employed when it is desired to perform classification of input packets employing, for example, layer 4 data or to enforce various rules or combination of rules to determine actions which may have to be taken in response to packets fulfilling a variety of different criteria. The rules engine is coupled to the switching engine (21) and if the rules engine is enabled the switching engine will not allow a packet to be transferred across the switch to an egress port until the rules engine has finished its operation in respect of that packet. The effect of the rules engine 29 may be to modify a port bit mask, for purposes not directly relevant to the invention.

The switching engine is coupled as schematically shown by line 28 to receive queue 16 in order to cause forwarding of the packet across the switch to the appropriate local destination port or ports.

Figure 2:
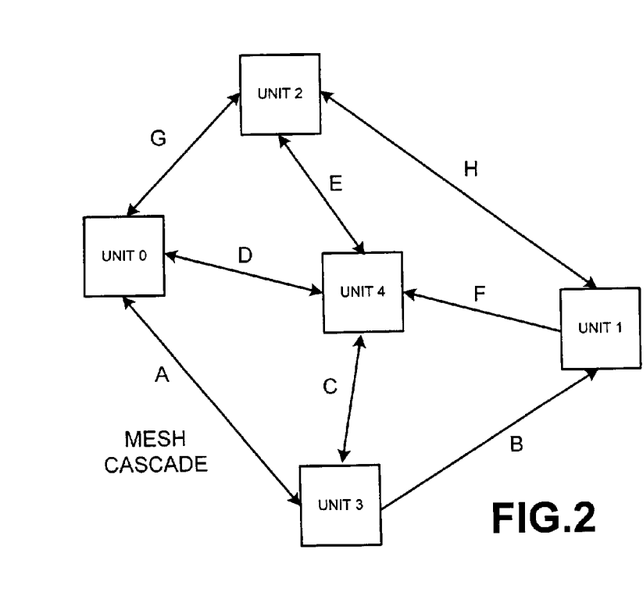
FIG. 2 illustrates a preferred form of cascade according to the invention.
Figure 3:
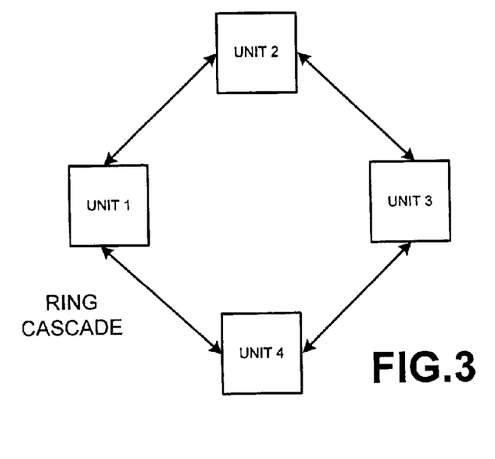
FIG. 3 illustrates a 'ring' cascade.
Figure 4:
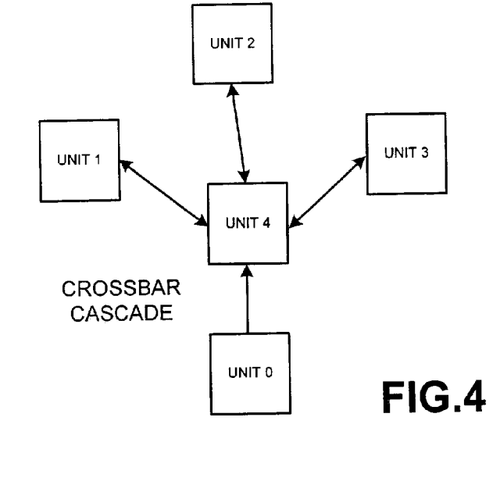
FIG. 4 illustrates a 'crossbar' cascade.

FIGS. 2, 3 and 4 illustrate several different cascade schemes which can be supported by the present invention.

FIG. 2 illustrates a general mesh configuration, including five units 0 to 4 (each of which is a unit as generally described with reference to FIG. 1), connected by, in this embodiment, bi-directional links A to H.

In the mesh shown in FIG. 2, a packet received from the external network at unit 0 (or any other unit) would be subject to a look-up for the destination port. As is explained later, a destination port identification is learnt against a stack-wide port number. This requires that the forwarding databases in the unit 0 to 4 become the same for all units. They may do so 'naturally' by broadcasting as necessary. An example of the learning process will be given later. The destination port identification is partitioned between a destination unit identification (for example the first three bits) and a port identification on that unit. If, in the example given, the destination port is not on unit 0, cascade logic, to be described later, will select the cascade link on which to forward the packet. This selection is done using the destination unit ID and the mesh routing table. When the packet is received on the cascade port of another unit, it can simply forward it to the destination port if the destination port is on this unit. If however the destination port is not on the second unit, the cascade logic will use the destination unit ID to pick the next cascade link to forward the packet. The source-routed mechanism removes the need of an address look-up on a cascade port and thus can improve the overall performance of the switch.

For the mesh configuration shown in FIG. 2, where five units are connected together using cascade links A to H as shown, the cascade links may be standard Ethernet links and each unit can be placed comparatively far apart, subject to the physical connection used. As the diagram shows, three cascade links may be used to connect from each unit to three other units. Thus for example, although a link from unit 0 via unit 4 to unit 1 may be initially specified, failure of unit 4 (or the link between unit 0 and unit 4) can be accommodated since at least one other route is available to unit 1. In order to choose which cascade link to use, a cascade protocol can be used in each unit to select the optimal path to each remote unit. If one assumes that cascade link D is used to forward a packet from unit 0 towards unit 1, all 'known' unicast packets can be directed via unit 4. If unit 4 is powered-down, the continually running cascade protocol including path D is no longer available and either link A or link G will be picked to communicate with unit 4.

A mesh configuration such as shown in FIG. 2 can also support a multiplicity of links between any pair of units.

FIGS. 3 and 4 illustrate two other non-mesh configurations which can be supported by the system. FIG. 3 is a ring cascade in which unit 0 can communicate via a designated cascade port to unit 1 and thence to unit 2 or may communicate via a different designated cascade port to unit 3 and thence to unit 2.

It will be observed that the mesh in FIG. 2 will devolve to the ring in FIG. 3 if unit 4 in FIG. 2 should fail.

FIG. 4 shows a 'crossbar' cascade wherein units 0 to 3 can communicate with each other only by way of the 'central' unit 4. Although the crossbar cascade is not a preferred arrangement, since it is critically dependent upon unit 4, the mesh cascade in FIG. 2 would devolve to the crossbar cascade of FIG. 4 in the (unlikely) event of the links A, B, G and H failing.

FIG. 2 shows a comparatively simple configuration and it will be obvious that additional resilience can be provided in FIG. 2 by, for example, connecting links between unit 0 and unit 1 and between unit 2 and unit 3. The number of links that can be used and the degree of resilience provided will increase as the number of units in the cascade increases.

Another aspect of FIG. 2 will be explained after a description of the cascade header information.

In the various cascades shown the units constituting the cascade may have a common network address or a set of common network addresses and MAC addresses for each router interface as described (for example) in copending US patent application for Weyman et al, Ser. No. 10/093,506 filed 11 Mar. 2002, commonly assigned herewith and incorporated herein by reference.

Packets within the Cascade

According to an aspect of the invention, all packets sent out by way of a cascade port will be provided with a special tag or 'header', in this example a 'cascade' header of 32 bits. This is preferably appended before the ordinary header which would be on a packet as it is received by the first (source) unit in the cascade; in principle the special header need not be in this position. The special header would be removed before it is forwarded from its final destination port within the cascade. The special header may be inserted by the receive block 16 of the source unit (i.e. the cascade unit which first receives the packet) and stripped by the block 17 of the destination unit.

Figure 5:
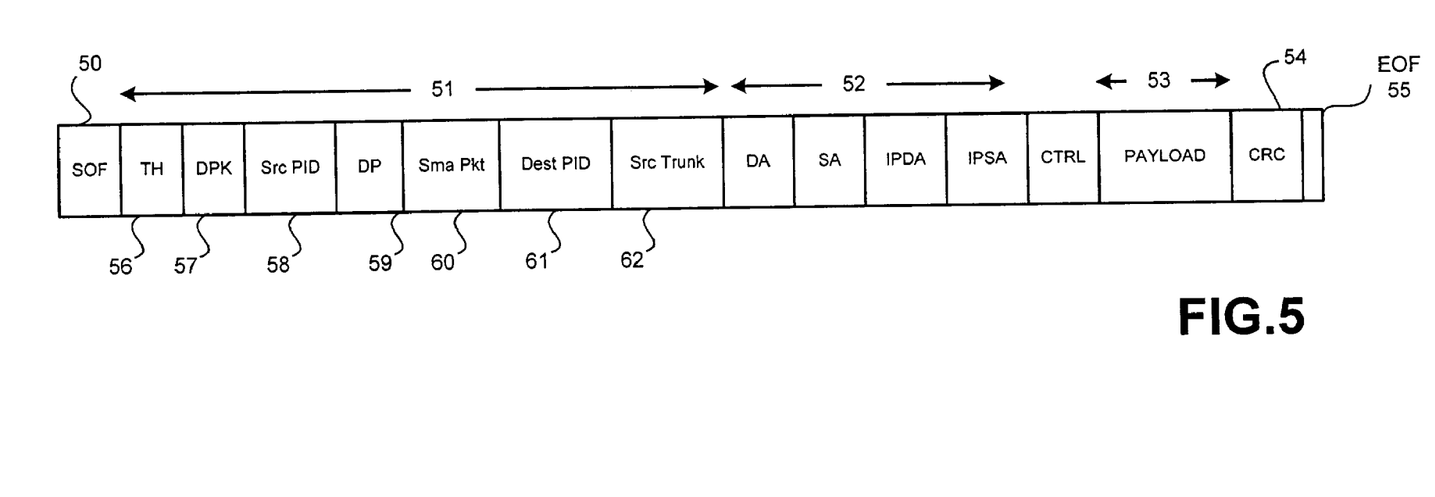
FIG. 5 illustrates a data packet provided with a pre-append header according to the invention.

FIG. 5 illustrates a packet as it would appear within the cascade.

Section 50 represents a start of frame sequence. Numeral 51 denotes the pre-pended header. Section 52 represents the ordinary header, typically including MAC destination and source addresses (DA, SA), network destination address (IPDA) and source address (IPSA), further information which is merely indicated as CTRL, a payload, that is to say the message data 53, a cyclic redundancy code section 54 and an end of frame sequence 55.

FIG. 5 illustrates a packet which is an ordinary data packet. As is understood by those skilled in the art, there may be other forms of packet, usually called control frames, which may include addresses but which have special operation codes and other forms of data in place of the payload 53.

The CRC section 54 is computed not merely on the basis of the contents of sections 52 and 53 (as in the normal packet) but on the basis of section 51 as well. As is known the CRC is re-computed by a MAC device at a port to determine whether the packet has been correctly received. This can be used to create an error indication if a packet with a special header 51 is received at a non-cascade port. It is usual to compute the CRC field employing a prescribed 'seed' word. If a packet with a special header had its CRC field computed in the same way as normal packets, the special header would be interpreted by a non-cascade port as part of a MAC address. If the CRC for packets within the cascade is computed using a distinctive seed, (which can readily be done at the source port for a packet) the packet's CRC will not conform to the CRC for ordinary packets; the existence of a port mismatch can be detected and the packet can be discarded.

Special Header Information

The first field in the special header is a trunk hash field 56, which may be a 3-bit field generated in the source unit and used to select a transmit port for port trunking. This is not of any direct relevance to the specific embodiment of the present invention.

Field 57 is, in this example, a single-bit field (DPK) which if set (valid) indicates that the destination port is known. If the bit is set it indicates that the destination port for the packet is also carried in the cascade status word and therefore the packet is forwarded to this port without another look-up on the cascade. It should be noted that the 'same port discard rule' must still be performed on the destination unit.

The next field, field 58, is in this example a 10-bit field (SrcPID[9:0]) which is the source port number in the unit that receives a packet. It is used for 'learning' addresses received correctly on the cascade. The field represented by the first three bits SrcPID[9.7] identify a cascade unit; the remaining bits constitute a sub-field identifying a port on that unit. The whole field uniquely identifies a port in the cascade.

The next field, field 59, is in this example a single-bit field called herein 'drop precedence'. This bit would be carried from the rules engine in the first (source) unit to all other units in the cascade. It would be used at the egress ports to determine the drop threshold for the egress (transmit) queue. If the bit were set, the lower drop threshold would be used to determine if the packet is to be added to the queue. Otherwise the ordinary queue for threshold would be used when adding the packet.

The next field is the 'Sma Pkt' field 60, in this example a single-bit field which would be set by the management of the cascade. It is known in systems of this general character to provide management packets, known as 'stack management agent' packets to configure the various units. Stack management agent packets have an operation code which specifies the action that they will perform in their destination (represented by the MAC address of the particular unit) together with data that may be required to update or modify registers which are controlled by the packets. It is understood that packets of this nature should not be discarded in transmit queues even though the queue is full.

Discard of packets in units of the general type shown in FIG. 1 may occur if, for example, a transmit queue for a port is full and yet there are packets in an ingress or receive queue which are required to be transferred to the egress queue. Egress queues can become full, that is to say they occupy all the storage space available for that queue, for a variety of reasons, one of which is congestion at a unit coupled to the respective destination port. It is usual for switching engines to operate a link table which will determine when a packet is ready to be transferred from the head of an ingress queue to the tail of an exit queue. If the exit queue is full, then a packet at the head of an ingress queue may be discarded by means of some known mechanism.

In ordinary network practice the phenomenon of 'head of line blocking' occurs if there is a packet at the head of an ingress queue which cannot be transferred to an exit queue. Head of line blocking is normally considered undesirable because packets in the same ingress queue cannot be transferred to other transmit queues (which may not be full) merely because there is a packet at the head of the link.

However, in relation to the total packets flowing through the switch, SMA packets will be comparatively sparse and it is not desirable that SMA packets should be blocked. Accordingly, an SMA packet is tagged so that it has an immunity to discard and in particular that it will not be subject to discard in the manner of an ordinary packet which would be causing head of line blocking.

The next field, field 61, is the 10-bit destination port identification, DestPID[9:0]. This is in the same format as the source port identification and, if the destination port known field 57 is set, the destination port identification field contains the destination port identification for the packet. Bits [9:7] identify the unit and bits [6:0] identify a port within the unit. If the DPK bit is set a single destination port, and therefore the destination unit, are known for the packet.

Finally, field 62 is a 6-bit field denoting 'source trunk'. This is a tag identifying the trunk number of the source port that receives the frame, if the source port is a member of a trunk. If the source port is not a member of the trunk then the field must be all ones. A trunk tag of this kind is the subject of our GB patent 2346524.

It was stated earlier that in a mesh cascade scheme, such as is normally envisaged in the present invention, there are inherently loops formed. However, the loops are not significant in relation to unicast packets.

For example, a packet received on any port of any switch will be subjected in that unit, the source unit, to a look-up. If the address is found, the destination port identification will be written into the header and the 'destination port known' bit will be set. The mesh tables ensure that there will be at any given time only a single route to the destination port via any intervening unit. Thus, for example, if a packet is received at unit 0 and is proceeding to unit 1 by way of unit 4, when it arrives at unit 4, although there is a loop back to unit 1 via either unit 3 or unit 2, the mesh table in unit 4 will prescribe that the packet should proceed to unit 1. Thus the existence of a loop will not matter because a packet will not be directed around a loop.

However, this does not apply for multicast and broadcast traffic. Thus the invention preferably includes a special mechanism to cope with the loops round which multicast or broadcast traffic may be circulated.

For the cases of multicast or broadcast traffic, it is intended that the loops for such traffic will be interrupted by specifying remote source units from which multicast or broadcast traffic will be rejected. The criterion whether to accept or reject traffic from a source unit can be based on whether unicast traffic will be forwarded to that unit. To take an example for FIG. 2, if unit 0 forwards unicast traffic towards unit 1 via the cascade link D, then it can be arranged that unit 0 will only accept multicast or broadcast traffic from unit 1 on cascade link D. Any multicast or broadcast traffic received on cascade links other than from source unit 1 will be rejected. However, other criteria can be adopted, as exemplified later.

Specific Example of Mesh Cascade

Figure 6:
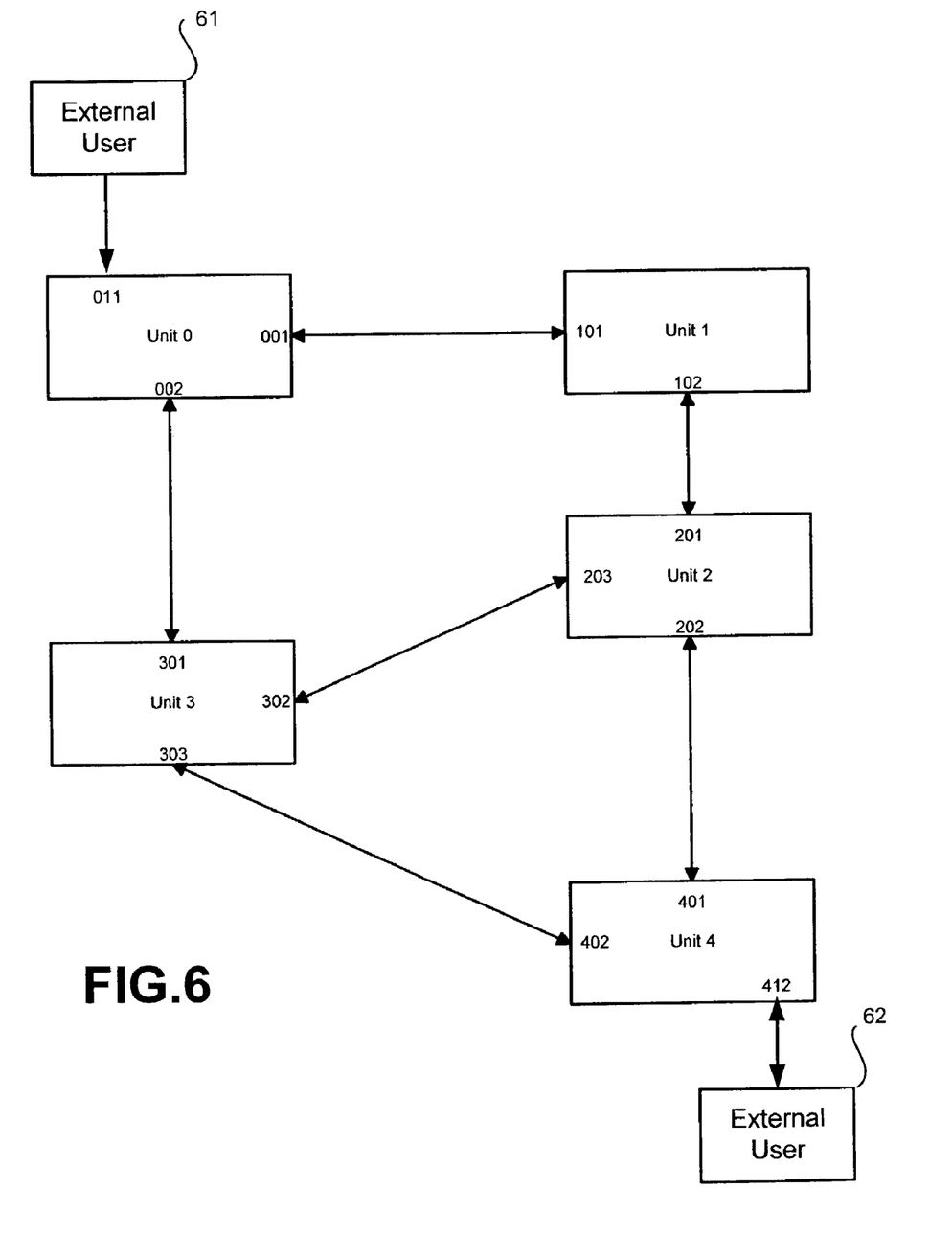
FIG. 6 illustrates a mesh cascade showing various numbered ports.

FIG. 6, as well as Tables 1 to 6 below, illustrates a specific example of the manner in which the database will be populated both initially and on the failure of a specific unit.

FIG. 6 illustrates a mesh cascade comprising five units, unit 0 to unit 4. As will be recalled, owing to the global allocation of port numbers, the port numbers are in specific ranges. In order to show this, the numbering of ports in FIG. 6 and the tables is represented as XYZ, where X is the 'box' number and YZ is the port number within the 'box'. Thus unit 0 may have ports 001 to 099, unit 1 may have port 101 to 199 and so on. In the specific example, unit 0 has port 001 connected to unit 1 and port 002 connected to unit 3. Unit 1 has port 101 connected to port 001 on unit 0 and port 102 connected to port 201 on unit 2. Unit 2 has in addition port 203 connected to port 302 on unit 3 and port 202 connected to port 401 on unit 4. Finally, unit 3 has its port 303 connected to port 402 on unit 4.

Although FIG. 6 does not explicitly show, each of the units has a plurality of cascade interfaces (described with reference to FIG. 7) by which the aforementioned tables cooperate with the look-up and switching engines to control the passage of packets to and from the cascade. FIG. 6 shows a single respective port per interface but in practice there may be a group of ports to increase the available information-carrying capacity between units.

Look-Ups and Address Learning

FIG. 6 includes an external network represented by two external users 61 and 62; the former is connected to a (non-cascade) port, arbitrarily denoted 011, on unit 0 and the latter is connected to a (non-cascade) port, e.g. port 412, on unit 4. By way of example, user 61 will send packets to and receive packets from user 62.

If a first packet received from user 61 at port 011 is 'unknown', the source address, e.g. SA61 will be learnt against port 011 in unit 0's LU database. Since the destination address (and therefore final destination port) is unknown, the packet's DPK bit will be clear (0) and the packet will be broadcast to all the units 1 to 4. At each of these units the source address SA61 will be learnt against the source port ID (011). Conversely, an 'unknown' packet received at port 412 from user 62 will be broadcast by unit 4 and at this unit and each of the others the source address (SA62) will be learnt against the source port ID (412). Accordingly, if port 011 receives subsequently a packet destined for user 62, a look-up in the 'source' unit 0 for the destination address (=SA62) will retrieve the destination port ID (i.e. 412) and the DPK bit will be set to 1. Consequently, as mentioned earlier, a look-up in either the destination unit 4 or any unit intermediate the source unit 0 and destination unit 4 is unnecessary and can be inhibited by this DPK bit.

Cascade Protocol

In order to establish the mesh table, the units in the cascade are programmed to run a cascade discovery protocol. This is performed by the transmission and reception of special management packets, which advertise their separation, so far as known, from the units. The separation, called herein 'path delay' is in units of links, so is unity for immediately adjacent units (e.g. unit 0 and unit 1 in FIG. 6). The path delay may be expressed as an 8-bit number (decimal 0 to 255) and where the unit is (so far as known) unreachable the delay will be expressed as a large number, e.g. the maximum (255), a number which represents an unlikely limit on the size of the mesh.

At the commencement of the protocol therefore, each unit will advertise to each of its neighboring unit that it has a path to that unit with path delay of 0. e.g. unit 0 will send messages to unit 1 and 3 via link 1 and 2 respectively. These messages will contain information that unit 0 is available with path delay of 0 and all other units are reachable with path delay of a very big value (say 255), i.e unreachable. Similar information will be sent to all units to all possible cascade interfaces, identified in Tables 1 to 4 by their corresponding port number. Based on the information received, each unit will update an internal database defining the path delay to each destination unit, the path delay in the database will have 1 added to the information received from cascade port. This database is then forwarded to each cascade interface periodically so that an optimal path from any unit to any other unit can be ascertained.

At a start time T the path delay database in each unit will be as shown in Table 1.

TABLE 1

| | Dest Unit Id | | | | |
|---|---|---|---|---|---|
| Unit | 0 | 1 | 2 | 3 | 4 |
| 0 (I/F 001) | 0 | 255 | 255 | 255 | 255 |
| 0 (I/F 002) | 0 | 255 | 255 | 255 | 255 |
| 1 (I/F 101) | 255 | 0 | 255 | 255 | 255 |
| 1 (I/F 102) | 255 | 0 | 255 | 255 | 255 |
| 2 (I/F 201) | 255 | 255 | 0 | 255 | 255 |
| 2 (I/F 202) | 255 | 255 | 0 | 255 | 255 |
| 2 (I/F 203) | 255 | 255 | 0 | 255 | 255 |
| 3 (I/F 301) | 255 | 255 | 255 | 0 | 255 |
| 3 (I/F 302) | 255 | 255 | 255 | 0 | 255 |
| 3 (I/F 303) | 255 | 255 | 255 | 0 | 255 |
| 4 (I/F 401) | 255 | 255 | 255 | 255 | 0 |
| 4 (I/F 402) | 255 | 255 | 255 | 255 | 0 |

As may be seen from Table 1 all that is shown at this time is that there is zero path delay from each unit to itself. Thus there is zero delay between cascade interfaces (i.e. ports) 001 and 002 because they are on the same unit and therefore part of the same 'node'.

The Table can be developed merely from a knowledge of which unit is immediately adjacent. Thus since port 001 (on unit 0) is connected by a link to port 101 (on unit 1), the entries for destination unit 1 against (port) cascade interface 001 and for destination unit 0 against (port) cascade interface 101 can each be changed to '1'. Likewise entry for unit 2 against port 102 becomes '1'. The result of this round of discovery is shown in Table 2.

At time T+1 the path database on each unit will be as follows:

TABLE 2

| | Dest Unit Id | | | | |
|---|---|---|---|---|---|
| Unit | 0 | 1 | 2 | 3 | 4 |
| 0 (I/F 001) | 0 | 1 | 255 | 255 | 255 |
| 0 (I/F 002) | 0 | 255 | 255 | 1 | 255 |
| 1 (I/F 101) | 1 | 0 | 255 | 255 | 255 |
| 1 (I/F 102) | 255 | 0 | 1 | 255 | 255 |
| 2 (I/F 201) | 255 | 1 | 0 | 255 | 255 |
| 2 (I/F 202) | 255 | 255 | 0 | 255 | 1 |
| 2 (I/F 203) | 255 | 255 | 0 | 1 | 255 |
| 3 (I/F 301) | 1 | 255 | 255 | 0 | 255 |
| 3 (I/F 302) | 255 | 255 | 1 | 0 | 255 |
| 3 (I/F 303) | 255 | 255 | 255 | 0 | 1 |
| 4 (I/F 401) | 255 | 255 | 1 | 255 | 0 |
| 4 (I/F 402) | 255 | 255 | 255 | 1 | 0 |

It will now be appreciated that by determining, for any unit $x_n$ whether path delays to two other units $x_m$, $x_p$ are known (i.e. less than the limit), the path delays between units $x_m$ and $x_p$ and the relevant ports can be computed. For example, the path delay from unit 0 to unit 1 (interface 101 to unit 1) is 1. The algorithm will look for the other interface(s) on unit 1 and add to the delays known for those interfaces to the delay known between unit 1 and unit 0 and write the result in place of the previously unknown delays between unit 0 and those other interfaces.

Thus, since the path delay from interface 102 to unit 2 is known to be 1 and interface 102 is on the same unit as interface 101 and the path delay between interface 101 and unit 0 is known (1), the path delay between interface 001 and unit 2 can be entered as (1+1)=2. The path delay table then becomes as shown in Table 3 immediately below.

TABLE 3

| Unit | Dest Unit Id | | | | |
|---|---|---|---|---|---|
|  | 0 | 1 | 2 | 3 | 4 |
| 0 (I/F 001) | 0 | 1 | 2 | 255 | 255 |
| 0 (I/F 002) | 0 | 255 | 2 | 1 | 2 |
| 1 (I/F 101) | 1 | 0 | 255 | 2 | 255 |
| 1 (I/F 102) | 255 | 0 | 1 | 2 | 2 |
| 2 (I/F 201) | 2 | 1 | 0 | 255 | 255 |
| 2 (I/F 202) | 255 | 255 | 0 | 2 | 1 |
| 2 (I/F 203) | 2 | 255 | 0 | 1 | 2 |
| 3 (I/F 301) | 1 | 2 | 255 | 0 | 255 |
| 3 (I/F 302) | 255 | 2 | 1 | 0 | 2 |
| 3 (I/F 303) | 255 | 255 | 2 | 0 | 1 |
| 4 (I/F 401) | 255 | 2 | 1 | 2 | 0 |
| 4 (I/F 402) | 2 | 255 | 2 | 1 | 0 |

The next stage is shown in Table 4.

TABLE 4

| Unit | Dest Unit Id | | | | |
|---|---|---|---|---|---|
|  | 0 | 1 | 2 | 3 | 4 |
| 0 (I/F 001) | 0 | 1 | 2 | 3 | 3 |
| 0 (I/F 002) | 0 | 3 | 2 | 1 | 2 |
| 1 (I/F 101) | 1 | 0 | 3 | 2 | 3 |
| 1 (I/F 102) | 3 | 0 | 1 | 2 | 2 |
| 2 (I/F 201) | 2 | 1 | 0 | 3 | 3 |
| 2 (I/F 202) | 3 | 3 | 0 | 2 | 1 |
| 2 (I/F 203) | 2 | 3 | 0 | 1 | 2 |
| 3 (I/F 301) | 1 | 2 | 3 | 0 | 3 |
| 3 (I/F 302) | 3 | 2 | 1 | 0 | 2 |
| 3 (I/F 303) | 3 | 3 | 2 | 0 | 1 |
| 4 (I/F 401) | 3 | 2 | 1 | 2 | 0 |
| 4 (I/F 402) | 2 | 3 | 2 | 1 | 0 |

This next stage of computation takes the same process further. Thus, for example, the path delay from unit 0 (from port 001) to unit 2 is two units (links). The path delay from unit 2 to unit 3 (from port 203) is 1 and therefore there is a path to unit 3 from unit 0 via ports 001, 102 and 203, so the entry for unit 3 against port 001 in Table 3 can be changed from 255 to 3. There is also from unit 2 to unit 3 in Table 3 a path of two units (via port 22). This process leads to the complete database in Table 4.

In order to develop the mesh table (or the exclusion table) from Table 4, multiple paths need to be eliminated. A variety of criteria can be employed for this purpose. A first step is preferably the selection of the shorter or shortest of multiple paths between the same units. Thus for example Table 4 shows three paths to unit 0 from unit 3, via ports 301, 302 and 303. The first of these has a delay 1 and is selected in preference to the other two, which have delay 3.

It is now required to eliminate all but one of any multiplicity of paths of equal delay between the same units. The elimination may be such as to reduce the numbers of entries for each port or be random or be based on port numbers, such as choosing the lowest or highest. For example, unit 2 can be reached with delay 2 from unit 0 via the port 001 or port 002.

In the example port 001 is selected. Different criteria may be adopted for the exclusion table. For example the final stage could be selection of the higher rather than the lower of two possible port numbers.

The mesh tables in each unit can now be completed with the optimum path for each destination unit and the respective egress port.

The computation for Tables 2 to 4 and the mesh (or exclusion) table may be performed by the CPUs of the units or by an external management entity.

Table 5 illustrates the population within each unit of the mesh table obtained for the units from the cascade protocol for the example in FIG. 6.

TABLE 5

| Dest Unit | 0 | 1 | 2 | 3 | 4 |
|---|---|---|---|---|---|
| Unit 0 |  |  |  |  |  |
| Cascade port Unit 1 |  | 001 | 001 | 002 | 002 |
| Cascade port Unit 2 | 101 |  | 102 | 101 | 102 |
| Cascade port Unit 3 | 201 | 201 |  | 203 | 202 |
| Cascade port Unit 4 | 301 | 301 | 302 |  | 303 |
| Cascade port | 402 | 401 | 401 | 402 |  |

Table 5 shows that the mesh register is in the same form for each unit. Each mesh register is denoted by the respective unit number and indicates, for each of the other destination units in the mesh, the cascade port which is to be used for the forwarding of a packet which, according to the look-up in the source unit (the unit that first receives the packet within the cascade system) is to employ.

For unit 0, there is no cascade port shown for that destination unit itself because, obviously, if a packet received by unit 0 from the external network is to be forwarded from a 'local' port on that unit, the packet will not be forwarded on the cascade.

If the initial look-up requires that the destination unit is unit 1, in the example given unit 0 will employ port 001 for forwarding the packet onto the cascade. In this example the same port 001 is used for packets of which the destination unit is unit 2. If the destination unit is unit 3, then unit 0 will employ port 002. The same port will be employed by unit 0 if the destination unit is unit 4.

Preferably the cascade protocol is run repeatedly, i.e. at suitable intervals such as 50 ms, and will rebuild the cascade path delay table and the mesh tables; then an operational failure in the cascade will automatically be accommodated on the next cycle of the discovery protocol. Alternatively or additionally a link failure detected by a PHY 14 can trigger the running of the discovery protocol.

Let it now be assumed that the connection between unit 0 and unit 1 is broken. The failure of this connection is easily determined by means of the relevant PHYs in the two units. In this case, the mesh table will need to change because packets received at unit 0 cannot proceed by way of the link between port 001 and 101 to unit 1 and also packets received at unit 0 and intended for a destination port on unit 2 cannot proceed by the initially preferred route.

Table 6 illustrates the changed mesh table in these circumstances.

TABLE 6

| Dest Unit | 0 | 1 | 2 | 3 | 4 |
|---|---|---|---|---|---|
| Unit 0 | | | | | |
| Cascade port Unit 1 | | 002 | 002 | 002 | 002 |
| Cascade port Unit 2 | 102 | | 102 | 102 | 102 |
| Cascade port Unit 3 | 203 | 201 | | 203 | 202 |
| Cascade port Unit 4 | 301 | 302 | 302 | | 303 |
| Cascade port | 402 | 401 | 401 | 402 | |

Accordingly, it will be seen that in unit 0, the cascade ports employed for packets destined for unit 1 and unit 2 will be forwarded from cascade port 002.

For similar reasons unit 1 will employ cascade port 102 for received packets of which the destination unit is unit 0 or unit 3 since the preferred route between port 001 and 101 is no longer available.

Likewise, in unit 2, the cascade port for packets of which the destination is unit 0 is cascade port 203, since packets forwarded from unit 2 and intended for unit 0 must proceed, in this example, by way of unit 3, and therefore out of port 203, rather than by way of unit 1.

For a path that is no longer available, e.g. owing to a unit's power-down or a broken cable, all path delays on the respective cascade interface will be set to '255' to indicate the relevant paths are no longer available. The periodically cascade protocol should be able to ascertain other paths to bypass the unavailable path.

Suppression of Loops for Multicast and Broadcast Packets

A corresponding table can also be employed to cause selective discard of multicast and broadcast packets to avoid, in effect, the creation of loops. The same table can be used and be populated in the same way as the previous Tables 5 and 6, but the significance of the entries will alter.

Table 7 shows an exclusion table for the same set-up as shown in FIG. 6. It corresponds to Table 5 except that the 'destination unit' entries now refer to source unit entries.

TABLE 7

| Source Unit | 0 | 1 | 2 | 3 | 4 |
|---|---|---|---|---|---|
| Unit 0 | | | | | |
| Cascade port Unit 1 | | 001 | 001 | 002 | 002 |
| Cascade port Unit 2 | 101 | | 102 | 101 | 102 |
| Cascade port Unit 3 | 201 | 201 | | 203 | 202 |
| Cascade port Unit 4 | 301 | 301 | 302 | | 303 |
| Cascade port | 402 | 401 | 401 | 402 | |

When therefore a multicast packet is received at a cascade port of a unit in the cascade, the absence of a set 'DPK' bit will enable (as described later) recourse to the exclusion table and prescribe the discard of a packet unless the source unit identification matches the entry in the table.

Thus for example, if unit 0 receives a multicast packet showing the source unit as unit 2, such a packet will be discarded unless it be received at cascade port 001, since this port is the port which is associated in the register with unit 2 as a destination unit. If the packet has a source unit identification of 2 and is received at port 002 (or any other port for that matter), it will be discarded.

FIG. 3 described earlier provides one example of a cascade wherein the mesh table and the exclusion table are preferably different and may easily be made so. The path delay from unit 1 to unit 3 is two units whether the route goes via unit 2 or unit 0. It may be desirable to route packets from unit 1 to unit 3 via unit 2 and to route packets from unit 3 to unit 1 via unit 0, to balance the traffic loading.

Cascade Logic

Figure 7:
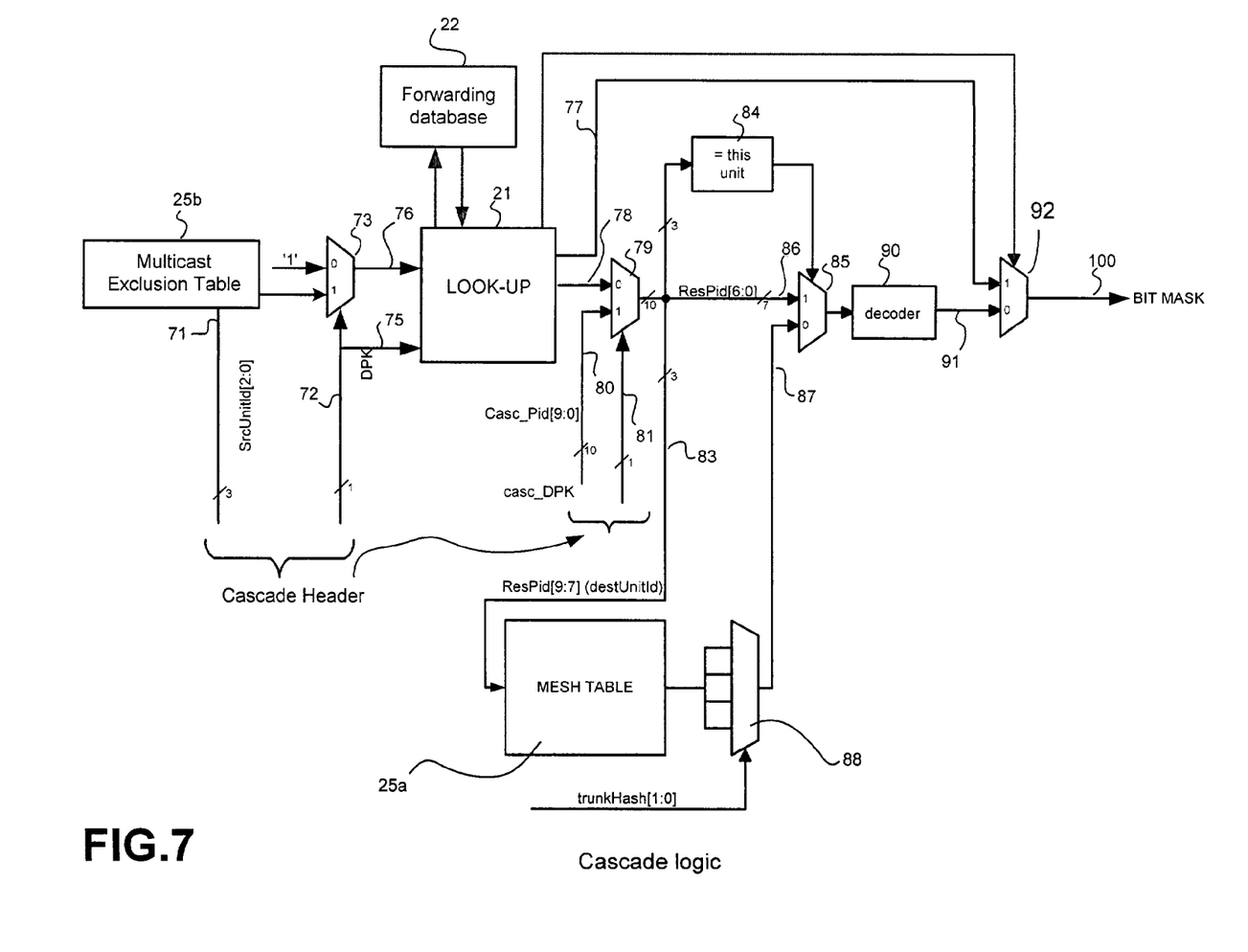
FIG. 7 illustrates a relevant part of one embodiment of a switch employing a mesh table and an exclusion table according to the invention.

FIG. 7 is a schematic diagram of the logic which is employed for controlling the passage of packets to and from cascade links.

FIG. 7 illustrates the manner in which the mesh table 25*a* and the multicast exclusion table 25*b* cooperate with the special cascade header and the look-up and switching engines 21 to control the passage of packets between the unit and the cascade links. It will be understood that the logic operations performed by the cascade logic in FIG. 7 will be performed in relation to the special header of a packet while the packet is temporarily stored on the receive side of a port, for example in a packet queue 16 held in or defined by a FIFO or other appropriate storage device. Packets are normally held in this manner while ordinary header information, such as that shown in section 52, is processed by a look-up engine and possibly a rules engine in ordinary practice. In this embodiment there is an exclusion table for each port. It would be possible to provide a single exclusion table for use by all the ports; in such a case the exclusion table would need from the ingress port an identification of it so that it could be determined whether the packet from the identified source port can properly be received at the unit's ingress port.

It will be recalled that for packets received from another unit in the cascade, a look-up for the destination port will not be required if the 'destination port known' field (DPK, as defined by line 75) is set to one. A look-up may be required if the DPK bit field is set to zero but the packet should be discarded if the DPK bit is set to zero and the packet has not been received from an allowed unit according to the exclusion table.

The exclusion table receives that portion of the source port identification field which identifies the source unit, by way of a 3-bit line 71, and obtained from the cascade header of the packet held for the time being in the respective receive queue, so that it can determine whether a packet from the source unit should be received at this port.

Moreover, the value of the DPK bit is provided on line 72 to the control input of a multiplexer 73 which has an upper input connected to receive a 'one' (1) signal and a lower input to receive an indicating binary signal from the multicast exclusion table 25*b*. The look-up engine 21 receives the DPK bit on line 75 and also a 'forward packet' signal on line 76 from multiplexer 73. A zero on line 76 normally indicates to the look-up engine that the packet is to be filtered. However in practice this instruction to filter could be over-ruled by the forwarding database, as in the case of management traffic between units, it being usually necessary for neighboring units to be able to communicate with each other on all relevant links.

If the DPK bit is set to one, signals on line 75 will inhibit the look-up engine in respect of the performance of address look-up; otherwise a look-up will proceed. Furthermore, if DPK bit is set to one, multiplexer 73 couples the 'one' to line 76 and the packet will be forwarded as normal. If the DPK bit is zero, denoting that a receive packet is 'unknown' or 'multicast', the packet needs to be discarded if it is not from an allowed source unit as defined by the exclusion table but will be allowed for forwarding if it is received from a permitted unit. When the DPK bit is zero the lower input of multiplexer 73 is selected. The multiplexer 73 will need to provide a 1 output on line 76, to allow the look-up engine to forward the packet as normal. The lower input to the multiplexer 73 is from the output of the exclusion table 25b indexed by the source unit ID.

If the look-up engine 21 is handling a multicast packet, it will produce on line 77 (in accordance with normal practice) a port bit mask to a multiplexer 92 and will operate a select line 93 for this multiplexer to provide a port bitmask on output lines 100.

The same applies if a packet is a broadcast packet. Those skilled in the art will be aware that a broadcast packet need not be broadcast from all the possible ports of a switch unit; at least some of the non-cascade ports may belong to different virtual local area networks and the switching engine would normally be arranged (in accordance with known practice) only to broadcast packets to members of the same VLAN. However, this is not directly relevant to the invention and will not be further described.

Where the packet is a unicast packet, there will be an output on line 78 from the look-up engine to a multiplexer 79. This multiplexer also receives on line 80 a cascade PID (the destination port ID as indicated in the special header of the received packet) and the selection between a destination port, within the cascade, and the cascade port identification, obtained from the received packet, is controlled by line 81 which will be active if the destination port ID in the special header of the received packet is valid, i.e. casc_DPK=1. This is a means by which, if the destination port identification (and therefore the destination unit) in the received packet is valid (as indicated by the DPK bit) a look-up for the egress port from this unit by the engine 21 may be inhibited, since the look-up is not needed.

The multiplexer 79 provides a 'result' output which is either a destination port ID obtained from a look-up (as when the unit is the source unit within the cascade for the packet) or the destination port identification obtained from the packet when the DPK bit is set. A portion of the result, i.e. the top three bits ResPID[9:7], denotes the destination unit whereas another portion, particularly the bottom six bits ResPID[6:0], denotes the destination port within the destination unit. The first portion of the result, in this embodiment the top three bits ResPID[9:7], is coupled to a decoder 84 which determines whether the destination unit identified by that portion is the unit itself. The bottom seven bits are the upper input 86 to a multiplexer 85 controlled by the decoder 84. Thus when the destination unit is 'this unit', ResPID[6:0] will denote a port on this unit and is selected by the multiplexer 85 for coupling to a decoder 90 which provides the appropriate port bitmask on lines 91 to multiplexer 92.

Otherwise the destination unit is another unit in the system and the destination unit identification ResPID[9:7] is used to index the mesh table 25a so as to fetch the identification of the egress port, as described with reference to FIG. 6 and Table 5.

The seven bits of the port ID obtained from the mesh table could be coupled directly to the lower input of multiplexer 85, and would control decoder 90 to provide the required port bit mask for the packet. In this embodiment however the output from the mesh table is coupled to a multiplexer 88 controlled by a signal 'trunkhash[1:0]' and providing an output on lines 87 to the multiplexer 85.

The multiplexer 88 is provided since there may be a trunk connection of up to four links between units in the cascade and the respective link is selected by the 'trunkhash' signal to the multiplexer 88.

If the packet is unicast, multiplexer 92 will select its lower input, i.e. the port bitmask provided by decoder 90.

The employment of port identifications, identifying source and destination ports uniquely within the cascade system, facilitates the management of the cascaded units as a single entity. In particular they may share a common network (IP) address and either a common MAC address or, if the cascade system includes more than one router, a single MAC address for each router, as proposed for example in the aforementioned US patent application for Weyman et al, Ser. No. 10/093,506 filed on 11 Mar. 2002 and commonly assigned herewith.

The invention claimed is:

1. An Ethernet switch, comprising:
    a multiplicity of ports, at least two configurable as cascade ports for receiving addressed data packets from and forwarding the addressed data packets to other Ethernet switches in a cascade system of Ethernet switches, wherein each addressed data packet includes a special header having a portion for identifying a destination Ethernet switch and destination port on the identified destination Ethernet switch within the cascade system;
    a look-up engine for performing an address look-up to at least relate address data in a received packet to forwarding data for the received packet; and
    control logic that inhibits the look-up engine from performing the address look-up for a received packet when the special header indicates that a single destination port for the packet within the cascade system is stored in a database of said Ethernet switch.

2. The Ethernet switch according to claim 1 wherein the special header includes a field for indicating a validity of the destination port.

3. The Ethernet switch according to claim 1 wherein the special header includes a portion for indicating a source Ethernet switch within the cascade system for the received packet.

4. The Ethernet switch according to claim 3 wherein the portion includes a field which identifies a unique source port of the source Ethernet switch within the cascade system for the received packet.

5. The Ethernet switch according to claim 3 wherein the control logic responds to said portion indicating the source Ethernet switch for the packet to prevent a the received packet from traversing, when forwarded by said Ethernet switch, a closed loop in the cascade system.

6. The Ethernet switch according to claim 3 wherein the control logic controls said Ethernet switch to interrupt reception of the packet if the source Ethernet switch is not related in the database with the cascade port on which the packet is received.

7. The Ethernet switch according to claim 1 further comprising:
    a processor operable to execute, in cooperation with other the Ethernet switches in the cascade system, a discovery protocol to establish which Ethernet switches in the cascade system are associated with each of the multiplicity of cascade ports of said Ethernet switch.

* * * * *